United States Patent
Li et al.

(10) Patent No.: US 11,773,303 B2
(45) Date of Patent: Oct. 3, 2023

(54) SOLVENT-BASED ADHESIVE COMPOSITIONS

(71) Applicants: Dow Global Technologies LLC, Midland, MI (US); Rohm and Haas Company, Collegeville, PA (US)

(72) Inventors: Wenwen Li, Pearland, TX (US); Joseph J. Zupancic, Glen Ellyn, IL (US); Paul Clark, Midland, MI (US); Thorsten Schmidt, Richterswil (CH)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 394 days.

(21) Appl. No.: 16/617,047

(22) PCT Filed: Apr. 4, 2018

(86) PCT No.: PCT/US2018/025983
§ 371 (c)(1),
(2) Date: Nov. 26, 2019

(87) PCT Pub. No.: WO2018/222273
PCT Pub. Date: Dec. 6, 2018

(65) Prior Publication Data
US 2021/0122954 A1  Apr. 29, 2021

Related U.S. Application Data

(60) Provisional application No. 62/512,993, filed on May 31, 2017.

(51) Int. Cl.
| | |
|---|---|
| *C09J 175/06* | (2006.01) |
| *C08G 18/12* | (2006.01) |
| *C08G 18/50* | (2006.01) |
| *C08G 18/76* | (2006.01) |

(52) U.S. Cl.
CPC .......... *C09J 175/06* (2013.01); *C08G 18/12* (2013.01); *C08G 18/509* (2013.01); *C08G 18/5084* (2013.01); *C08G 18/7671* (2013.01)

(58) Field of Classification Search
CPC .......................... C09J 175/06; C08G 18/5084
See application file for complete search history.

(56) References Cited

U.S. PATENT DOCUMENTS

| | | | |
|---|---|---|---|
| 4,734,303 A | 3/1988 | Fujiwara et al. | |
| 5,144,824 A | 9/1992 | Kobayashi et al. | |
| 5,202,391 A * | 4/1993 | Yamazaki | C09J 175/04 525/111 |
| 5,360,649 A | 11/1994 | Sato et al. | |
| 5,478,897 A * | 12/1995 | Sasano | C08L 63/00 528/53 |
| 6,022,913 A | 2/2000 | Tanaka et al. | |
| 6,238,783 B1 | 5/2001 | Komai et al. | |
| 10,155,890 B2 | 12/2018 | Vietti et al. | |
| 2007/0109911 A1 | 5/2007 | Neubauer | |
| 2010/0277884 A1 | 11/2010 | Arifuku et al. | |
| 2017/0226391 A1* | 8/2017 | Vietti | B32B 7/12 |

FOREIGN PATENT DOCUMENTS

| | | |
|---|---|---|
| JP | 5051574 | 3/1993 |
| JP | 2848047 B2 | 1/1999 |
| JP | 02950057 | 9/1999 |
| JP | 2950057 B2 | 9/1999 |
| JP | 2015007226 | 1/2015 |
| WO | 2008139996 | 11/2008 |

OTHER PUBLICATIONS

Adcote 577 Datasheet. Available online at https://www.laminatingadhesiveproducts.com/product/adcote-577 (Year: 1995).*
PCT/US2018/025983, International Search Report and Written Opinion dated Jun. 26, 2018.

* cited by examiner

*Primary Examiner* — Michael M Dollinger
(74) *Attorney, Agent, or Firm* — Boyle Fredrickson, S.C.

(57) ABSTRACT

Solvent-based adhesive composition are disclosed, the compositions comprising (A) a polyester-urethane resin, (B) a phosphate ester compound, and (C) an aliphatic isocyanate curing agent. Methods for preparing a solvent-based adhesive composition, the methods comprising providing a polyester-urethane resin, providing a phosphate ester compound, mixing the polyester-urethane resin and phosphate ester compound to form a resin mixture, diluting the resin mixture in a solvent to form a diluted resin mixture having an application solid content of from 25 to 55 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12. Laminates prepared comprising the solvent-based adhesives and according to the disclosed methods are also disclosed.

19 Claims, No Drawings

SOLVENT-BASED ADHESIVE COMPOSITIONS

REFERENCE TO RELATED APPLICATIONS

The present application claims the benefit of U.S. Provisional Application No. 62/512,993, filed on May 31, 2017.

FIELD OF THE DISCLOSURE

The instant disclosure relates to solvent-based adhesive compositions. More particularly, the disclosure relates to solvent-based adhesive compositions for use in, for example, high-performance laminating adhesive applications, the compositions exhibiting improved adhesion to metal structures, such as foil, and improved heat and chemical resistance. The solvent-based adhesive compositions include a polyester-urethane resin modified with a phosphate ester compound, and an aliphatic isocyanate curing agent. The disclosure further relates to methods for preparing such solvent-based adhesive compositions.

BACKGROUND AND SUMMARY OF THE DISCLOSURE

Adhesive compositions are useful for a wide variety of purposes. For instance, some adhesives are used to adhere layers of substrates together, thereby forming laminate structures comprising two or more substrate layers. Flexible packaging laminating adhesives are applied between laminating films for packaging of foodstuffs, pharmaceuticals, and industrial consumables. Laminating adhesives can be classified generally into three categories: (1) solvent-based laminating adhesives, (2) solventless laminating adhesives, and (3) water-based laminating adhesives. Within the solvent-based category, solvent-based polyurethane has been widely used to achieve relatively good heat, moisture, and chemical resistance.

Solvent-based adhesive compositions can be used in high-performance laminate applications (e.g., retort, hot-fill, boil-in-bag, etc.). In order to achieve the high performance required for such applications, polyester systems including epoxidized bisphenol-A are commonly used. The use of bisphenol-A epoxy resins has recently encountered regulatory and user challenges regarding the perceived safety of bisphenol-A-based materials for food packaging.

Accordingly, bisphenol-A-free adhesive compositions suitable for high-performance applications, particularly for use in laminate structures used in high performance applications, are desirable.

Solvent-based adhesive compositions are disclosed herein. In some embodiments, the solvent-based adhesive compositions include a first part comprising (A) a polyester-urethane resin and (B) a phosphate ester compound, and a second part comprising (C) an aliphatic isocyanate curing agent. The aliphatic isocyanate curing agent (C) of the second part crosslinks the components of the first part. In some embodiments, the phosphate ester compound has the structure (I):

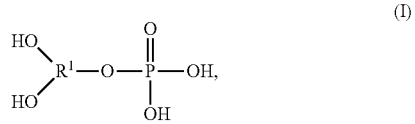

(I)

wherein $R^1$ is any organic group.

Methods for preparing solvent-based adhesive compositions are also disclosed. The methods include providing a polyester-urethane resin, providing a phosphate ester compound, mixing the polyester-urethane resin and the phosphate ester compound to form a resin mixture, diluting the resin mixture in a solvent to form a diluted resin mixture having an application solid content from 25 to 55 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12.

The disclosed adhesive compositions are bisphenol-A-free and are suitable for use in, among other things, laminate structures used in high-performance food packaging applications, such as retort applications, hot-fill applications, and boil-in-bag applications. The disclosed adhesive compositions are particularly suitable for laminate structures used in high performance applications.

DETAILED DESCRIPTION OF THE DISCLOSURE

The solvent-based adhesive compositions disclosed herein are suitable for use in laminate structures comprising two or more flexible or rigid substrates. In some embodiments, the substrates can include low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. In some embodiments, laminate structures prepared using the disclosed solvent-based adhesive compositions can comprise multiple layers/substrates, each layer/substrate being any one of the materials described herein, and the like.

The adhesive compositions are particularly suitable for use in laminate structures subjected to retort processing (e.g., exposure to temperatures of 120° C. or higher for 30 or more minutes), hot-fill processing (e.g., exposure to temperatures of 66° C. or higher for 30 or more minutes), and boil-in-bag processing (e.g., exposure to temperatures of 100° C. or higher for 30 or more minutes) (i.e., high performance applications). In some embodiments, the solvent-based adhesive compositions can be used in metal food packaging applications such as deep drawn cans and containers with metal lidding or flexible heat seal lidding. In some embodiments, the solvent-based adhesive compositions can be used in food pouches, ready-to-eat meals, can coatings, etc.

In some embodiments, the solvent-based adhesive compositions include a first part comprising (A) a polyester-urethane resin and (B) a phosphate ester compound, and a second part comprising (C) an aliphatic isocyanate. The aliphatic isocyanate curing agent (C) of the second part crosslinks the components of the first part, thereby generating a polyester-urethane-polyurethane polymer network.

The two parts of the disclosed adhesive compositions are mixed prior to contacting a substrate (e.g., when applied on a laminating machine). The mixed adhesive is applied to one substrate and dried before another layer of substrate is applied. The laminate can then be cured at ambient temperature or elevated temperature.

First Part: (A) Polyester-Urethane Resin

In some embodiments, the solvent-based adhesive compositions include a first part comprising (A) a polyester-urethane resin. In some embodiments, the polyester-urethane resin is a hydroxy-terminated polyurethane resin. Suitable hydroxy-terminated polyurethane resins can be prepared through the reaction of an isocyanate (e.g., a monomeric isocyanate and/or a polyisocyanate) and a polyester polyol. As used herein, a "polyisocyanate" is any compound that contains two or more isocyanate groups. For example, polyisocyanates may include dimers, trimers, etc. In such a reaction, the polyester polyol is present in excess in order to produce a hydroxy-terminated polyurethane resin, in other words, the stoichiometric ratio of hydroxyl groups to isocyanate groups should be higher than 1.

Suitable isocyanates for use according to this disclosure include, but are not limited to, aromatic isocyanates, aliphatic isocyanates, cycloaliphatic isocyanates, and combinations of two or more thereof. An "aromatic isocyanate" is an isocyanate that contains an isocyanate radical bonded to an aromatic radical and contains one or more aromatic rings. An "aliphatic polyisocyanate" is an isocyanate that contains an isocyanate radical bonded to an aliphatic radical which can be bonded to other aliphatic groups, a cycloaliphatic radical or an aromatic ring (radical). A "cycloaliphatic polyisocyanate" is a subset of aliphatic isocyanates, wherein the chemical chain is ring-structured.

Suitable aromatic isocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof.

Suitable aliphatic isocyanates have 3 to 16 carbon atoms, or 4 to 12 carbon atoms, in the linear or branched alkylene residue, such as hexamethylene diisocyanate ("HDI"), 1,4-Diisocyanatobutane, 1,3-xylylene diisocyanate ("1,3-XDI"), and 1,4-xylylene diisocyanate ("1,4-XDI"). Suitable cycloaliphatic isocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("H$_{12}$MDI").

Suitable aliphatic and cycloaliphatic isocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H$_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof.

Additional isocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

As used herein, "polyol" refers to a compound having two or more hydroxy groups (i.e., —OH) per molecule. As used herein, "ester" refers to a compound that contains an ester linkage. As used herein, "polyester" refers to a compound that contains two or more ester linkages per molecule. A compound that is both a polyester and a polyol is a "polyester polyol." An aliphatic polyester polyol is a polyester polyol that contains no aromatic ring in its molecule. An aromatic polyester polyol is a polyester polyol that contains one or more aromatic rings in its molecule.

In some embodiments, the polyester-urethane resin accounts for form 65 to 99.5 percent by weight of the total weight of the polyester-urethane resin (A) and the phosphate ester (B). In some embodiments, the polyester-urethane resin accounts for form 95 to 99 percent by weight of the total weight of the polyester-urethane resin (A) and the phosphate ester (B).

Commercially available examples of polyester-urethane resins suitable for use according to this disclosure include ADCOTE™ 811A EA, available from The Dow Chemical Company.

First Part: (B) Phosphate Ester Compound

In some embodiments, the solvent-based adhesive compositions include a first part comprising (B) a phosphate ester compound. Without being bound to theory, it is thought that the polyester-urethane resin (A) and the phosphate ester compound (B) react with the isocyanate curing reagent (C) through reaction between the hydroxyl groups with the isocyanate functionality to generate a homogeneous polyester-urethane-polyurethane network. In addition, the phosphate ester functionalities of the phosphate ester compound react/complex with reactive sites on metal films, metal oxide coated films or polymer films to improve adhesion.

In some embodiments, the phosphate ester compound accounts for from 0.5 to 35 percent by weight of the total weight of the polyester-urethane resin (A) and the phosphate ester compound (B). In some embodiments, the phosphate ester accounts for from 0.5 to 5 percent by weight of the total weight of the polyester-urethane resin (A) and the phosphate ester compound (B).

In some embodiments, the phosphate ester compound has the structure (I):

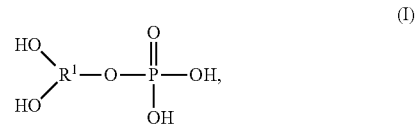

where $R^1$ is any organic group. In addition to the pendant groups shown in structure (I), $R^1$ may or may not have one or more additional pendant —OH groups, and $R^1$ may or may not have one or more additional pendant groups of structure (I). Any two or more of the —OH groups and the group(s) of structure (I) may or may not be attached to the same atom of $R^1$. Preferably, each —OH group and each group of structure (I) is attached to a separate atom of R'.

A convenient way to characterize $R^1$ is to describe the compound having structure (II):

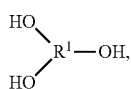

(II)

where $R^1$ is the same as in structure (I). The compound having structure (II) is known herein as a "precursor polyol."

In some embodiments, suitable precursor polyols have number average molecular weight of 90 or higher, or 200 or higher, or 400 or higher. In some embodiments, suitable precursor polyols have number average molecular weight of 4,000 or lower, or 2,000 or lower, or 1,200 or lower, or 900 or lower, or 500 or lower. In some embodiments, suitable precursor polyols have number average molecular weight of from 200 to 4,000, or from 400 to 2,000, or from 400 to 1,200, or from 400 to 900.

In some embodiments, suitable precursor polyols are alkyl higher polyols, monosaccharides, disaccharides, and compounds having structure (III):

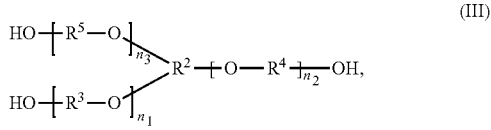

(III)

where each of $R^2$, $R^3$, $R^4$, and $R^5$ is, independent of the other, any organic group; each of $n_1$, $n_2$, and $n_3$ is, independent of the other, an integer from 0 to 10. In addition to the pendant groups shown in structure (III), $R^2$ may or may not have one or more additional pendant groups. It is further understood that any two or more of the pendant groups may or may not be attached to the same atom of $R^2$. In some embodiments, a mixture of compounds having structure (III) is present, where the compounds of structure (III) differ from each other in the value of one or more of $n_1$, $n_2$, and $n_3$. Such mixtures are described herein by stating a non-integer value for the parameter $n_1$, $n_2$, or $n_3$, where the non-integer value represents the number average of that parameter. When it is desired to assess the molecular weight of such a mixture, the number-average molecular weight is used.

Among precursor polyols having structure (III), preferably each pendant group is attached to a separate atom of $R^2$.

Among precursor polyols having structure (III), preferably, one or more of $R^3$, $R^4$, and $R^5$ is a hydrocarbon group having 1 to 4 carbon atoms, or 2 to 3 carbon atoms, or 3 carbon atoms. Among precursor polyols having structure (III), preferably, one or more of $R^3$, $R^4$, and $R^5$ is an alkyl group, which may be linear or cyclic or branched or a combination thereof; more preferably, one or more of $R^3$, $R^4$, and $R^5$ is a linear or branched alkyl group; more preferably, one or more of $R^3$, $R^4$, and $R^5$ is a branched alkyl group. Preferably, $R^3$, $R^4$, and $R^5$ are identical to each other.

Among precursor polyols having structure (III), preferably, one or more of $n_1$, $n_2$, and $n_3$ is from 0 to 8. Among precursor polyols having structure (III), preferably, one or more of $n_2$, and $n_3$ is 1 or more. Among precursor polyols having structure (III), preferably, one or more of $n_1$, $n_2$, and $n_3$ is 6 or less. Among precursor polyols having structure (III), preferably, $n_1$, $n_2$, and $n_3$ are the same as each other.

A preferred group of precursor polyols having structure (III) are compounds in which each of $R^2$, $R^3$, $R^4$, and $R^5$ is an alkyl group; such precursor polyols are known herein as alkoxylated alkyl triols. In a triol, when at least one of $n_1$, $n_2$, and $n_3$ is 1 or more and $R^2$ has the structure (IV):

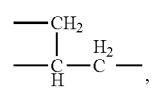

(IV)

then the triol is known herein as an alkoxylated glycerol. In alkoxylated triols, when each of $R^3$, $R^4$, and $R^5$ is a branched alkyl group with exactly 3 carbon atoms, the alkoxylated triol is known herein as a propoxylated triol. A propoxylated triol in which $R^2$ has structure (IV) is known herein as propoxylated glycerol.

Among precursor polyols that are alkyl higher polyols, preferred are those with 10 or fewer carbon atoms; more preferred are those with 6 or fewer carbon atoms; more preferred are those with 3 or fewer carbon atoms; more preferred is glycerol.

More preferred precursor polyols are alkyl higher polyols and compounds having structure (III). It is noted that, if $n_1=n_2=n_3=0$ and if $R^2$ is either an alkyl group or an alkyl group having hydroxyl groups, then the compound having structure IV is an alkyl higher polyol.

A preferred group of precursor polyols are alkyl triols and alkoxylated alkyl triols. Among these, more preferred are glycerol and alkoxylated glycerols; more preferred are alkoxylated glycerols. Among alkoxylated glycerols, preferred are propoxylated glycerols.

Another class of suitable phosphate ester compounds are those that contain urethane linkages. Phosphate ester compounds containing urethane linkages are made by reacting one or more suitable phosphate-functional polyol with one or more polyisocyanate, preferably including one or more diisocyanate. Preferably, the amount of polyisocyanate is kept low enough so that some or all of the reaction products are phosphate-functional polyols. Alternatively, the polyol may be first reacted with the polyisocyanate to make an —OH terminated prepolymer which is then reacted with polyphosphoric acid. The phosphate ester compound with urethane linkages will have a number average molecular weight in the range of 1,000 to 6,000 and preferably in the range of 1,200 to 4,000, and more preferably in the range of 1,400 to 3,000.

In some embodiments, the phosphate ester compound is the reaction product of reactants including a precursor polyol and a phosphoric-type acid, the phosphate ester compound having the structure (I).

Preferably, the amounts of phosphoric-type acid and precursor polyol are chosen to determine the ratio of $M_p:M_x$ as follows:

$M_{hy}$=number of hydroxyl groups per molecule of the precursor polyol $N_x=M_{hy}-2$ $M_x$=(moles of precursor polyol)×($N_x$)

$M_p$=moles of phosphorous atoms contained in the phosphoric-type acid

In some embodiments, the ratio of $M_p:M_x$ is 0.1:1 or higher, or 0.2:1 or higher, or 0.5:1 or higher, or 0.75:1 or higher. In some embodiments, the ratio of $M_p:M_x$ is 1.1:1 or less.

In some embodiments, the weight ratio of phosphoric-type acid to precursor polyol is 0.005:1 or higher, or 0.01:1 or higher, or 0.02:1 or higher. In some embodiments, the weight ratio of phosphoric-type acid to precursor polyol is 0.3:1 or lower, or 0.2:1 or lower, or 0.12:1 or lower.

In some embodiments, the phosphoric-type acid contains polyphosphoric acid. In some embodiments, the amount of polyphosphoric acid in the phosphoric-type acid is, by weight based on the weight of the phosphoric-type acid, 75% or more, or 80% or more, or 90% or more. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppo×142)/Fppa, expressed as a percentage. Then, the grade of that polyphosphoric acid is the ratio, expressed as a percentage: Grade=PCppo/72.4.

In some embodiments, polyphosphoric acid is used that has grade of 100% or higher, or 110% or higher. In some embodiments, polyphosphoric acid is used that has grade of 150% or lower, or 125% or lower.

In some embodiments, the disclosed solvent-based adhesive compositions contain one or more phosphorous-free polyols in addition to the one or more phosphate-functional polyols.

Further information about suitable phosphate esters and their preparation can be found in PCT Publication No. WO/2015/168670, which is herein incorporated by reference in its entirety.

Second Part: (C) Aliphatic Isocyanate Curing Agent

In some embodiments, the solvent-based adhesive compositions include a second part comprising an aliphatic isocyanate curing agent (C). In some embodiments, the polyester-urethane resin (A) and the phosphate ester compound (B) are combined to form a resin mixture. The resin mixture is diluted in a solvent to form a diluted resin mixture having an application solid content of from 25 to 55 weight percent, or from 30 to 45 weight percent, or from 35 to 40 weight percent, based on the total weight of the diluted resin mixture. The diluted resin mixture can then be cured with the aliphatic isocyanate curing agent (C) at a mix ratio (parts by weight resin mixture before dilution:parts by weight aliphatic isocyanate curing agent) of from 100:1 to 100:12.

The aliphatic isocyanate employed may be any suitable aliphatic isocyanate. Suitable aliphatic isocyanates include, but are not limited to, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate, dodecane di- and triisocyanate, isophorone diisocyanate ("IPDI"), hexamethylene diisocyanate ("HDI"), diisocyanatodicyclohexylmethane ("$H_{12}MDI$"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof.

As gathered from the foregoing, the present disclosure contemplates the employment of two parts, which preferably are mixed using a suitable mixer (e.g., an electrically, pneumatically, or an otherwise powered mechanical mixer) prior to or during application to a substrate to form the adhesive composition. Mixing may take place at any suitable time in the process, such as before, during, or as a result of the application process. All of the present steps may be carried out under ambient room temperature conditions. As desired, heating or cooling may be employed.

Methods for preparing a solvent-based adhesive composition are disclosed herein. In some embodiments, providing a polyester-urethane resin, providing an phosphate ester compound, mixing the polyester-urethane resin and the phosphate ester compound to form a resin mixture, diluting the resin mixture in a solvent to form a diluted resin mixture having an application solid content of from 25 to 55 weight percent, or from 30 to 45 weight percent, or from 35 to 40 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12, or from 100:4 to 100:10.

The disclosed adhesive compositions are useful for bonding substrates together. The substrates may be similar materials or dissimilar materials. Wet and dry bond lamination of a plurality of substrate layers is possible. The disclosed adhesive compositions can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the adhesive compositions may be done over an entire surface or only a portion of it, such as along an edge, or at intermittent locations. Once applied to the substrate, the compositions are dried, such as by application of heat and air flow, or some other suitable approaches for removing substantially all remaining solvent.

The disclosed adhesive compositions can be used on a wide variety of one or a plurality of suitable substrates such as high, low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. The adhesive compositions are particularly attractive for packaging and sealing applications. For example, a plastic film, metal film, or metallized plastic film can be laminated (e.g., over all or at least a portion of its surface, such as along its edges, or at intermittent locations) with the adhesive compositions of the disclosure. In some embodiments, food may be packaged for boil-in-bag preparation, or the resulting laminate might be used for sealing or packaging some other article. When heavy gauge foil is employed in the laminate structure the resulting laminate can be cold drawn to yield a cup or package which can be filled with food and then covered and sealed with a similar laminate structure to form a sealed container.

For the cold drawability and optimum performance of the adhesive system it is critical that the final laminate structure have balanced mechanical properties. The balanced mechanical properties will permit distribution of load and stress across the laminate under fabrication and use conditions for the laminate with temperature variation. The adhesive with the phosphate ester enables the laminate to have improved mechanical properties to balance and transfer the load and strain within the laminate structure. The Storage Modulus of the cured neat polyester-urethane-polyurethane with and without the phosphate ester additive will be in the range of about 50 to 1,500 MPa at 0° C. and 0.7 to 6.0 MPa at 25° C. and 0.10 to 1.50 at 60° C. The critical performance difference will be in the % elongation observed for the laminate structure as a function of orientation. The % elongation in the machine and transverse direction will be more balanced in both directions being in the range of 8.0 to 10.5% and difference in the machine and transverse direction will be on the order of an absolute value of 0.0 to 0.30% due to the ability of the phosphate ester to interact with the surface of the substrates and help balance the difference in distribution of forces across the laminate structure.

Examples of the Disclosure

The present disclosure will now be described in further detail by discussing Illustrative Examples ("IE") and Comparative Examples ("CE") (collectively "the Examples"). However, the scope of the present disclosure is not, of course, limited to the IEs.

Raw Materials

The Examples are prepared using raw materials including a polyester-polyurethane resin commercially available from The Dow Chemical Company under the trade name ADCOTE™ 811A EA, aliphatic isocyanate curing agents commercially available from The Dow Chemical Company under the trade name MOR-FREE™ 200C and ADCOTE™ 811B, a polyether polyol commercially available from The Dow Chemical Company under the trade name VORNAOL™ CP 450, an isocyanate commercially available from The Dow Chemical Company under the trade name ISONATE™ 125M, 115% Polyphosphoric acid commercially available from Sigma-Aldrich, and ethyl acetate and methyl ethyl ketone commercially available from Sigma-Aldrich.

Acid Value (AV) is measured by the method of ASTM D3655-06 (American Society for Testing and Materials, West Conshohocken, Pa., USA).

Hydroxy number (OHN) is measured by the method of ASTM D 4274-88 (American Society for Testing and Materials, West Conshohocken, Pa., USA).

Size Exclusion Chromatography (SEC) used two PLgel Mix-B and PLgel Mixed-D columns and Viscotek's triple detector. Polystyrene standards were used to establish a universal calibration curve that determines the weight-averaged and number-averaged molecular weights. The sample was diluted with THF to a polymer concentration of approximately 2.5 mg/ml prior to analysis.

Solution viscosity is measured with a Brookfield viscometer according to method ASTM D2196-10 (ASTM, West Conshohocken, Pa., USA).

The Examples are prepared using films including Prelam, a 12 μm (48 gauge) polyester ("PET") film laminated to a 0.00035 mil aluminum foil with ADCOTE™/Coreactant F at 3.26 g/m² (2.00 lbs/ream), commercially available from The Dow Chemical Company, 1.5 gauge aluminum foil, and a cast polypropylene ("CPP") film having a thickness of 1 mil or 2 mil.

Preparation of Phosphate Ester Adhesion Promoter

A 1 L multi-neck round bottom flask was dried in an oven, flushed with dry $N_2$ for 30 minutes, then charged with 150 grams of VORANOL™ CP 450 polyether polyol and placed under an $N_2$ sweep of 70 mL/min A syringe was loaded with 4 grams of 115% Polyphosphoric acid (PPA). The PPA was added dropwise to the polyether polyol with strong agitation. A minimal temperature increase was observed. The reactor contents were heated to 100° C. for 1 hour then cooled to 45° C. 40 grams of ethyl acetate was added, followed by slow addition of 50 grams of ISONATE™ 125M diisocyanate. A significant exotherm was controlled with the application of an ice batch to keep the reaction pot below 75° C. and development of a yellow to amber color was observed. The reactor was then maintained at 65° C. for 1 hour, at which point the content was cooled and packaged. The product had the following properties: 76.0% Solids, OHN of 112 mg KOH/g, AV of 19.0 mg KOH/g, Viscosity at 25° C. of 1665 mPa·s, SEC Analysis of Mn 1700, Mw 4100, Polydispersity of 2.4, 4.4%≤500 Daltons, and 16.0%≤1000 Daltons.

Detailed adhesive formulations for the Comparative Examples ("CE") and Illustrative Examples ("IE"), including pertinent raw materials, are summarized in Table 1.

TABLE 1

| | | \multicolumn{8}{c}{Adhesive Formulations for CE1, CE2, CE3 and IE1 to IE5} |
|---|---|---|---|---|---|---|---|---|---|
| | | CE1 (wt %) | CE2 (wt %) | CE3 (wt % | IE1 (wt %) | IE2 (wt %) | IE3 (wt %) | IE4 (wt %) | IE5 (wt %) |
| Side A | ADCOTE ™ 811A EA | 54.26 | 53.03 | 59.26 | 53.56 | 52.34 | 52.94 | 51.73 | 58.08 |
| | Phosphate ester | 0 | 0 | 0 | 0.54 | 0.53 | 1.06 | 1.06 | 1.18 |
| | Methyl ethyl ketone | 43.29 | 43.79 | 34.81 | 43.47 | 43.96 | 43.56 | 44.04 | 34.81 |
| Side B | MOR-FREE ™ 200C | 2.44 | 3.18 | | 2.43 | 3.17 | 2.43 | 3.17 | |
| | ADCOTE ™ 811B | | | 5.93 | | | | | 5.93 |
| Total | | 100.0 | 100.0 | 100 | 100.0 | 100.0 | 100.0 | 100.0 | 100 |
| Phosphate Ester loading level | | 0.0% | 0.0% | 0.0% | 1.0% | 2.0% | 1.0% | 2.0% | 2.0% |
| Mix ratio (Side A:Side B) | | 100/4.5 | 100/6.0 | 100/10.0 | 100/4.5 | 100/6.0 | 100/4.5 | 100/6.0 | 100/10.0 |

Preparation of Neat Adhesive Castings and DMA/DSC Characterization

The various polyester-urethane and polyester-urethane/phosphate ester compound blend systems are cured with aliphatic isocyanate curing agent at various mix ratios. The adhesive castings are prepared by taking about 15 grams of polyester-urethane and polyester-urethane/phosphate ester compound blend solution and mixing it with the aliphatic isocyanate at various mix ratios in a bottle. The adhesive solution is mixed for approximately 15 to 30 minutes and then poured into a polymethylpentene petri dish. The solvent is allowed to evaporate overnight in a fume hood on a level surface, and then the castings are placed in a convection oven and cured for 7 days at 45° C.

The castings are analyzed via DMA (TA Instruments Q800) using the Multi-Frequency-Strain Mode. A single applied frequency of 1 Hz from −100° C. to 150° C., with a heating rate of 3° C./min with an applied strain of 0.01% and a preload force of 0.01 N is used.

Glass transition temperature ($T_g$) is determined using a TA Instruments Q100 DSC with auto sampler and RCS interfaced with a desktop computer using TA Advantage for Q series software. About 10 milligrams of sample is placed into a t-zero pan with an aluminum hermetic lid. The samples are run using the following conditions:
Initial Heat: 80° C. for 5 minutes.
Initial Heat: −85° C.×10° C./min=>200° C.
Cooling Cycle: 200° C.×10° C./min=>−85° C.
$2^{nd}$ Heat: −85° C.×10° C./min=>240° C.; return to room temperature.

$T_g$ via DSC is reported for the second heat cycle.

Critical properties of the samples analyzed are summarized in Table 2. A homogeneous polymer network with well-maintained mechanical properties was formed with introduction of phosphate ester adhesion promoter to the system. The Storage Modulus of the cured neat polyester-urethane-polyurethane with and without the phosphate ester additive will be in the range of about 50 to 1,500 MPa at 0° C. and 0.7 to 6.0 MPa at 25° C. and 0.10 to 1.50 at 60° C.

TABLE 2

DMA Characterization Results

| Sample ID | Adhesive Formulation | Tg (° C.) | Storage Modulus @ 0° C. (MPa) | Storage Modulus @ 25° C. (MPa) | Storage Modulus @ 60° C. (MPa) |
|---|---|---|---|---|---|
| CE4 | CE1 | 4.33 | 515 | 2.67 | 0.62 |
| CE5 | CE2 | 4.71 | 929 | 4.12 | 1.02 |
| CE6 | CE3 | 1.89 | 113 | 2.22 | 0.20 |
| IE6 | IE1 | 3.46 | 889 | 3.28 | 0.63 |
| IE7 | IE2 | 3.68 | 688 | 3.86 | 0.85 |
| IE8 | IE3 | 1.64 | 417 | 2.94 | 0.61 |
| IE9 | IE4 | 4.29 | 584 | 4.18 | 0.90 |
| IE10 | IE5 | 0.80 | 130 | 2.46 | 0.20 |

Adhesive Lamination Studies

The various polyester-urethane and polyester-urethane/phosphate ester compound blend systems are cured with aliphatic isocyanate curing agent at various mix ratios. The compositions of the adhesive formulations are summarized in Table 1. The adhesive solution is mixed for approximately 15 to 30 minutes and then coated onto Prelam with a Mayer rod to yield a coating weight of about 4.48 to 4.88 g/m² (2.75 to 3.00 lbs/ream), and then laminated to 2 mil CPP film using a nip temperature of 82° C. The laminates are cured in a convection oven at 45° C. for up to 14 days.

Adhesion bond strengths are determined on a 15 mm wide strip of laminate on a Thwing-Albert Tensile Tester (Model QC-3A) with a 50 Newton load cell at a 10.0 cm/min rate. The following abbreviations are used to describe test results: "AS" is adhesive split, "FT" is film tear, "FS" is film stretch, "AT" is adhesive transfer, and "AF" is adhesive failure.

The drawability of the laminates is determined by examining the percent elongation of the laminate (Foil/CPP) in the machine and transverse direction on laminate strip 25.4 mm×175 mm utilizing an Instron Tensile Tester. The test conditions for the Instron Tensile Tester are: fixture gap 7.62 cm, Load Cell 0-50 Newton's, rate of extension (head speed) 5.08 cm/min, elongation at Break (%) was recorded.

Typical bond strength data and % Elongation data are summarized in Table 3.

The critical performance difference will be in the % elongation observed for the laminate structure as a function of orientation. The % elongation in the machine and transverse direction will be more balanced in both directions being in the range of 8.0 to 10.5% and difference in the machine and transverse direction will be on the order of an absolute value of 0.0 to 0.30% due to the ability of the phosphate ester to interact with the surface of the substrates and help balance the difference in distribution of forces across the laminate structure.

TABLE 3

Summary of Bond Strength and % Elongation data

| Sample ID | Adhesive formulation | Bond strength (N/15 mm)[a] | | | | % Elongation[b] | |
|---|---|---|---|---|---|---|---|
| | | Green bond | 1 day | 2 days | 7 days | 14 days | Trans | Mach |
| CE7 | CE1 | 3.37, AF | 6.19, AT | 7.94, AT | 5.99, AT | 7.24, AT | | |
| CE8 | CE2 | 2.43, AF | 6.16, AT | 8.17, AT | 6.69, AT | 7.97, AT | | |
| CE9 | CE3 | 2.31, AS | 12.58, FS | | 14.27, FS | 14.13, FS | 9.625 | 8.32 |
| IE11 | IE1 | 2.24, AS | 7.42, AT | 9.68, FS | 11.21, FS | 11.21, FS | | |
| IE12 | IE2 | 2.00, AS | 11.38, FS | 11.29, FS | 12.32, FS | 12.27, FS | | |
| IE13 | IE3 | 2.29, AS | 9.69, FS | 10.11, FS | 11.00, FS | 11.79, FS | | |

TABLE 3-continued

Summary of Bond Strength and % Elongation data

| Sample ID | Adhesive formulation | Bond strength (N/15 mm)[a] | | | | | % Elongation[b] | |
|---|---|---|---|---|---|---|---|---|
| | | Green bond | 1 day | 2 days | 7 days | 14 days | Trans | Mach |
| IE14 | IE4 | 2.41, AS | 12.63, FS | 12.06, FS | 11.58, FT | 10.90, FS | | |
| IE15 | IE5 | 2.52, AS | 13.75, FS | | 15.01, FS | 14.16, FS | 8.73 | 8.54 |

[a]Laminating structure: Prelam/2 mil CPP
[b]Laminating structure: 1.5 Gauge foil/1 mil CPP, Trans: Transverse Direction, Mach: Machine Direction In addition to the embodiments described above and those set forth in the Examples, many embodiments of specific combinations are within the scope of the disclosure, some of which are described below:

Embodiment 1. A solvent-based adhesive composition, comprising:
(A) a polyester-urethane resin;
(B) a phosphate ester compound; and
(C) an aliphatic isocyanate curing agent.

Embodiment 2. The solvent-based adhesive composition of any preceding or succeeding Embodiment, wherein the polyester-urethane resin is the reaction product of a polyester polyol and an isocyanate.

Embodiment 3. The solvent-based adhesive composition of any preceding or succeeding Embodiment, wherein the polyester-urethane resin accounts for from 65 to 99.5 percent by weight of the total weight of the polyester-urethane resin (A) and the phosphate ester (B).

Embodiment 4. The solvent-based adhesive composition of any preceding or succeeding Embodiment, wherein the polyester-urethane resin accounts for from 95 to 99 percent by weight of the total weight of the polyester-urethane resin (A) and the phosphate ester (B).

Embodiment 5. The solvent-based adhesive composition of any preceding or succeeding Embodiment, wherein the phosphate ester compound accounts for from 0.5 to 35 percent by weight of the total weight of the polyester-urethane resin (A) and the phosphate ester (B).

Embodiment 6. The solvent-based adhesive composition of any preceding or succeeding Embodiment, wherein the phosphate ester compound accounts for from 1 to 5 percent by weight of the total weight of the polyester-urethane resin (A) and the phosphate ester (B).

Embodiment 7. The solvent-based adhesive composition of any preceding or succeeding Embodiment, wherein the phosphate ester compound has the structure (I):

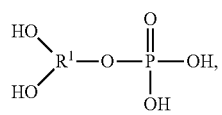

where $R^1$ is any organic group.

Embodiment 8. The solvent-based adhesive composition of any preceding or succeeding Embodiment, wherein $R^1$ has the structure (II):

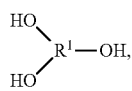

where $R^1$ is the same as in structure (I).

Embodiment 9. The solvent-based adhesive composition of any preceding or succeeding Embodiment, wherein the phosphate ester compound comprises a urethane linkage.

Embodiment 10. The solvent-based adhesive composition of any preceding or succeeding Embodiment, further comprising a solvent.

Embodiment 11. The solvent-based adhesive composition of any preceding or succeeding Embodiment, wherein the solvent is selected from the group consisting of ethyl acetate, methyl ethyl ketone, methyl acetate, and combinations thereof.

Embodiment 12. A method for preparing a solvent-based adhesive composition, the method comprising:
providing a polyester-urethane resin;
providing a phosphate ester compound;
mixing the polyester-urethane resin and the phosphate ester compound to form a resin mixture;
diluting the resin mixture in a solvent to form a diluted resin mixture having an application solid content from 25 to 55 weight percent, based on the total weight of the diluted resin mixture; and
curing the diluted resin mixture with an aliphatic isocyanate curing agent at a mix ratio (parts by weight resin mixture before dilution:parts by weight aliphatic isocyanate curing agent) of from 100:1 to 100:12.

Embodiment 13. The method for preparing a solvent-based adhesive composition of any preceding or succeeding Embodiment, wherein the diluted resin mixture has an application solid content of from 35 to 40 weight percent, based on the total weight of the diluted resin mixture Embodiment 14. The method for preparing a solvent-based adhesive composition of any preceding or succeeding Embodiment, wherein the mix ratio (parts by weight resin mixture before dilution:parts by weight aliphatic isocyanate) is from 100:4 to 100:10.

Embodiment 15. A laminate structure comprising the adhesive composition of any preceding or succeeding Embodiment.

Embodiment 16. The laminate structure according to any preceding or succeeding Embodiment, further comprising a metal substrate.

Embodiment 17. The laminate structure according to any preceding or succeeding Embodiment, further comprising a polyolefin substrate.

What is claimed is:
1. A solvent-based adhesive composition, comprising:
(A) a polyester-urethane resin;
(B) a phosphate ester compound;
wherein the phosphate ester compound accounts for from 0.5 to 5 percent by weight of the total weight of the polyester-urethane resin (A) and the phosphate ester compound (B), and (A) and (B) amount to 100 wt % of the first part; and a second part composed of
(C) an aliphatic isocyanate curing agent; wherein the phosphate ester compound comprises a urethane linkage, a polyester-urethane-polyurethane polymer network is generated upon cure.

2. The solvent-based adhesive composition of claim 1, wherein the polyester-urethane resin is the reaction product of a polyester polyol and an isocyanate.

3. The solvent-based adhesive composition of claim 1, wherein the polyester-urethane resin accounts for from 65 to 99.5 percent by weight of the total weight of the polyester-urethane resin (A) and the phosphate ester (B).

4. The solvent-based adhesive composition of claim 1, wherein the phosphate ester compound accounts for from 1 to 5 percent by weight of the total weight of the polyester-urethane resin (A) and the phosphate ester (B).

5. The solvent-based adhesive composition of claim 1, wherein the phosphate ester compound has the structure (I):

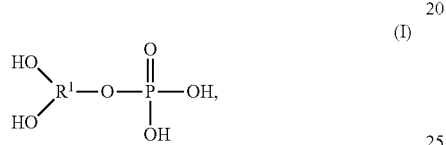

where $R^1$ is any organic group.

6. The solvent-based adhesive composition of claim 5, wherein $R^1$ has the structure (II):

where $R^1$ is the same as in structure (I).

7. The solvent-based adhesive composition of claim 1, further comprising a solvent.

8. The solvent-based adhesive composition of claim 7, wherein the solvent is selected from the group consisting of ethyl acetate, methyl ethyl ketone, methyl acetate, and combinations thereof.

9. A method for preparing a solvent-based adhesive composition, the method comprising:
providing a hydroxyl-terminated polyester-urethane resin;
providing a phosphate ester compound, wherein the phosphate ester compound comprises a urethane linkage;
mixing the polyester-urethane resin and the phosphate ester compound to form a resin mixture;
diluting the resin mixture in a solvent to form a diluted resin mixture having an application solid content from 25 to 55 weight percent, based on the total weight of the diluted resin mixture; and
curing the diluted resin mixture with an aliphatic isocyanate curing agent at a mix ratio (parts by weight resin mixture before dilution : parts by weight aliphatic isocyanate curing agent) of from 100:1 to 100:12.

10. The method for preparing a solvent-based adhesive composition of claim 9, wherein the diluted resin mixture has an application solid content of from 35 to 40 weight percent, based on the total weight of the diluted resin mixture.

11. The method for preparing a solvent-based adhesive composition of claim 9, wherein the mix ratio (parts by weight resin mixture before dilution:
parts by weight aliphatic isocyanate) is from 100:4 to 100:10.

12. A laminate structure comprising the adhesive composition of claim 1.

13. The laminate structure according to claim 12, further comprising a metal substrate.

14. The laminate structure according to claim 12, further comprising a polyolefin substrate.

15. The solvent-based adhesive composition of claim 1 wherein (A), (B), and (C) amount to 100 weight % of the first part and the second part.

16. The solvent-based adhesive composition of claim 15 wherein the polyester- urethane resin (A) is an aliphatic hydroxyl-terminated polyester-urethane resin and has a stoichiometric ratio of hydroxyl groups to isocyanate groups that is greater than 1.

17. A solvent-based adhesive composition, comprising:
a first part composed of (A) an aliphatic polyester-urethane resin, and (B) a phosphate ester compound, wherein (A) and (B) amount to 100 wt % of the first part; and
a second part composed of (C) an aliphatic isocyanate curing agent.

18. The solvent-based adhesive composition of claim 17 wherein (A), (B), and (C) amount to 100 weight % of the first part and the second part.

19. The solvent-based adhesive composition of claim 18 wherein (A) is an aliphatic hydroxyl-terminated polyester-urethane resin.

* * * * *

UNITED STATES PATENT AND TRADEMARK OFFICE
CERTIFICATE OF CORRECTION

| | |
|---|---|
| PATENT NO. | : 11,773,303 B2 |
| APPLICATION NO. | : 16/617047 |
| DATED | : October 3, 2023 |
| INVENTOR(S) | : Li et al. |

It is certified that error appears in the above-identified patent and that said Letters Patent is hereby corrected as shown below:

In the Claims

Claim 1 – Column 14, Line 60, after "1. A solvent-based adhesive composition, comprising:" add:
a first part composed of Claim 1 – Column 14, Line 61, after "(A) a polyester-urethane resin" add:
that is a hydroxyl-terminated polyester-urethane resin;

Signed and Sealed this
Nineteenth Day of November, 2024

Katherine Kelly Vidal
*Director of the United States Patent and Trademark Office*